UNITED STATES PATENT OFFICE.

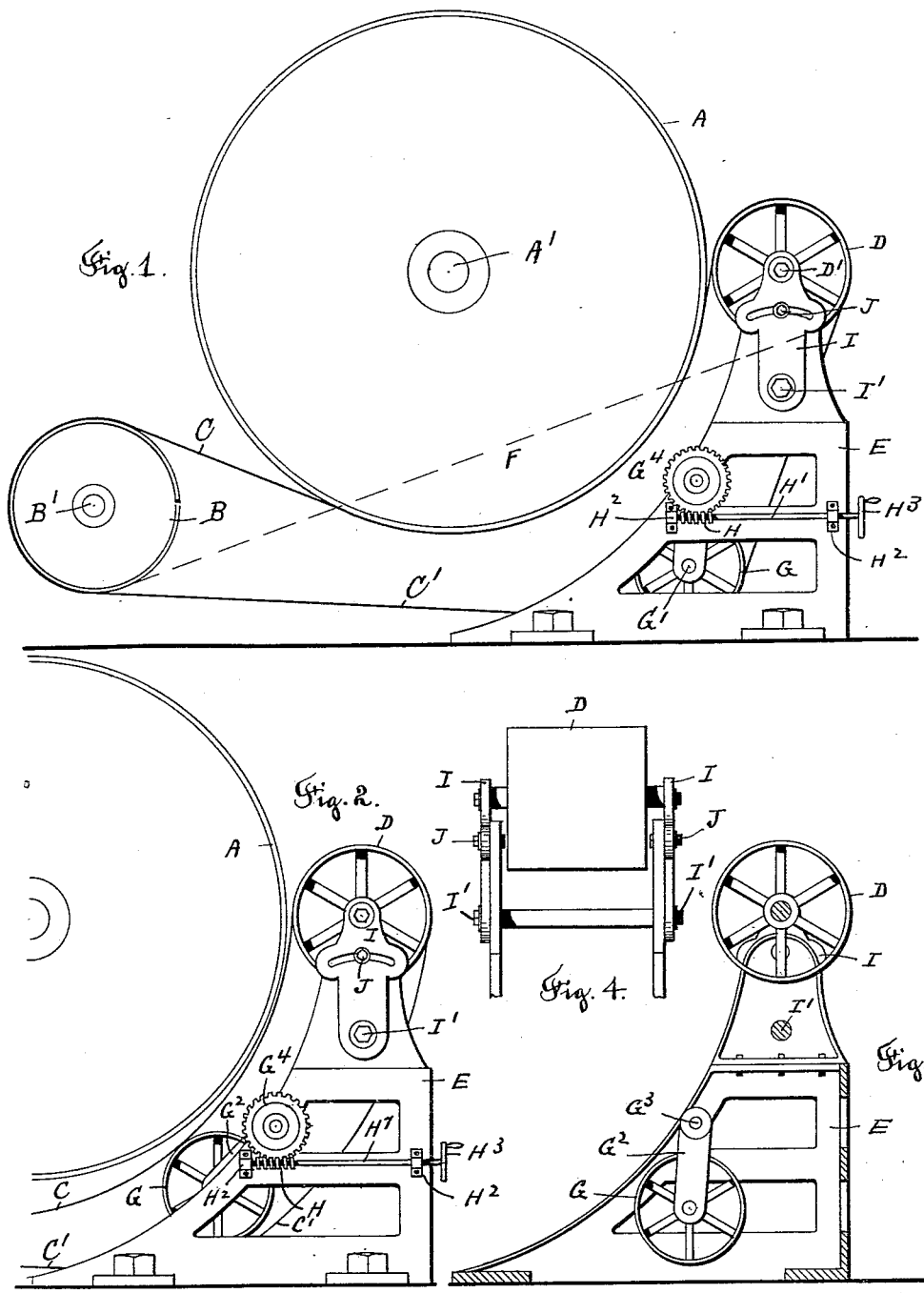

FREDERICK H. PERRY, OF MONTPELIER, VERMONT, ASSIGNOR TO GEORGE A. PECK, OF SAME PLACE.

APPARATUS FOR TRANSMITTING POWER.

SPECIFICATION forming part of Letters Patent No. 560,229, dated May 19, 1896.

Application filed December 30, 1893. Serial No. 495,186. (No model.)

*To all whom it may concern:*

Be it known that I, FREDERICK H. PERRY, a citizen of the United States, and a resident of Montpelier, in the county of Washington and State of Vermont, have invented a new and useful Improvement in an Apparatus for Transmitting Power, of which the following is a specification, accompanied by drawings forming part of the same, and in which—

Figure 1 represents a side view of the apparatus embodying my invention with the several parts shown in their respective positions when the apparatus is in action. Fig. 2 is a side view of the framework supporting the belt-carrier pulley and the belt-tightening pulley, with the latter pulley in that position by which the belt is withdrawn from contact with the driving-pulley. Fig. 3 is a side view of the framework supporting the carrier-pulley and tightening-pulley with the side next the beholder removed, and Fig. 4 represents a rear view of the carrier-pulley and the upper portion of its supporting-framework.

Similar letters refer to similar parts in the different figures.

My present invention relates to an improvement in an apparatus for transmitting power by means of a driving-belt with its outer surface held in contact with the driving-pulley instead of enveloping the same.

Referring to Fig. 1, A denotes a driving pulley or drum carried upon the revolving shaft A', and B the driven pulley carried upon the shaft B', which receives rotary motion from the driving-pulley A by means of a belt C, enveloping the driven pulley B and a carrier-pulley D rotating upon a shaft D', supported by the framework E, so that the outer surface of the driving-belt C will be held against the periphery of the driving-pulley A. The pulley D is held by the frame E a considerable distance above the horizontal plane of the shaft B', so as to cause the driving-belt C to be wrapped about a larger arc of the driving-pulley A, causing the driving side of the belt C, which is in contact with the pulley A, to be carried below a straight line joining the lower sides of the pulleys B and D and indicated by the broken line F. The opposite or slack side C' of the belt C is held below the periphery of the pulley A by means of a belt-tightening pulley G, carried upon a shaft G', held in a framework G², which is attached to a shaft G³, journaled in the frame E and carrying upon its outer end a worm-gear G⁴, engaged by a worm H upon a horizontal shaft H', which is journaled in bearings H² H², attached to the sides of the framework. The shaft H' is provided with a crank-wheel H³, by which the shaft H' is turned, rotating the shaft G³ and carrying the frame G² and pulley G from the position shown in Figs. 1 and 3 to that shown in Fig. 2, and vice versa. Supporting the carrier-pulley D is the shaft D', held in the upper ends of arms I I, which are pivoted at I', and are adjustably held in position by bolts J, passing through a curved slot J', thereby allowing the position of the carrier-pulley D to be carried toward or away from the driving-pulley A by the adjustment of the pivoted plates I.

When the tightening-pulley G is brought against the slack side C' of the driving-belt C, the belt becomes tightened and drawn against the periphery of the pulley A, causing the rotary motion of the pulley A to be transmitted through the belt to the carrying-pulley D; but when the tightening-pulley G is carried into the position shown in Fig. 2 the entire belt becomes slackened and the driving side of the belt which has been drawn in contact with the periphery of the driving-pulley E falls away from the pulley and out of contact therewith, as represented in Fig. 2. The driving-belt is therefore readily brought into contact with the driving-pulley A by means of the pulley G, and the strain or tension upon the driving-belt can be increased, as desired, by the rotation of the shaft G³ without requiring a change in the position of the framework E.

In case the tightening-pulley G were dispensed with it is obvious that the carrier-pulley D must be placed in such position with reference to the pulleys A and B that the broken line F, joining the lower sides of the pulley B and D, would fall below the periphery of the driving-pulley A, which would greatly decrease the surface of the pulley A in contact with the driving-belt, and also that the driving-belt could only be tightened or slackened by changing the position of the pulley D, or by moving the shaft carrying the pulley B.

By employing the third pulley G the position of the pulleys D and B can be fixed and the belt thrown into or out of operation by the action of the pulley G alone and the tension of the belt increased at will. The adjustable plates I I permit the position of the pulley D to be changed with reference to the periphery of the driving-pulley within certain limits without requiring a change in the position of the framework E, allowing the pulley D to be carried toward the periphery of the driving-pulley and thereby increase the surface in contact with the driving-belt.

What I claim as my invention, and desire to secure by Letters Patent, is—

1. In an apparatus for transmitting power, the combination with a driving-pulley and a driven pulley, of an upright frame E, a carrier-pulley D supported by said frame, a belt carried by said driven pulley and said carrier-pulley, a rocking shaft $G^3$ journaled in said frame E, a frame $G^2$ attached to said rocking shaft, a tightening-pulley G carried by said frame, a worm-gear attached to said shaft, a shaft $H^7$ supported by said frame E, a worm H and a hand-wheel $H^3$ carried on said shaft $H^7$ by which said pulley G is moved into contact with the belt, substantially as described.

2. In an apparatus for transmitting power, the combination with a driving-pulley and a driven pulley, of an upright frame E at the side of said driving-pulley and at the opposite side from said driven pulley, a pair of pivoted arms I, a carrier-pulley supported by said arms, means for adjustably attaching said arms to said frame, whereby said carrier-pulley is moved toward or away from said driving-pulley, a belt carried by said carrier-pulley and said driven pulley, a rocking shaft journaled in said frame and between the sides of said belt, a frame extending radially from said rocking shaft and a tightening-pulley supported by said radial frame and means for moving said pulley against the sides of the belt, substantially as described.

Dated this 26th day of December, 1893.

FRED. H. PERRY.

Witnesses:
HARLAN W. KEMP,
DELLA A. FAY.